(12) United States Patent
Tang

(10) Patent No.: US 7,545,799 B2
(45) Date of Patent: Jun. 9, 2009

(54) INTERNET TIME MULTIPLEXED CIRCUIT CONNECTION FOR WIRE SPEED CONNECTION AKIN TO PSTN SWITCHED CIRCUIT CONNECTION SUITABLE FOR MULTIMEDIA/VOICE/FAX/REALTIME APPLICATIONS

(76) Inventor: Bob Tang, 69 Warham Road, London, England (GB) N4 1AR ( * ) Notice: Subject to any disclaimer, the term of this patent is extended or adjusted under 35 U.S.C. 154(b) by 173 days.

(21) Appl. No.: 09/779,939

(22) Filed: Feb. 9, 2001

(65) Prior Publication Data

US 2001/0033577 A1 Oct. 25, 2001

Related U.S. Application Data

(60) Provisional application No. 60/182,518, filed on Feb. 15, 2000.

(51) Int. Cl.
*H04L 12/66* (2006.01)
(52) U.S. Cl. .................................. 370/352
(58) Field of Classification Search .............. 370/352, 370/442, 401, 508, 353, 354, 355, 356
See application file for complete search history.

(56) References Cited

U.S. PATENT DOCUMENTS

| | | | | |
|---|---|---|---|---|
| 4,569,041 | A * | 2/1986 | Takeuchi et al. | 370/352 |
| 5,239,542 | A * | 8/1993 | Breidenstein et al. | 370/376 |
| 5,268,903 | A * | 12/1993 | Jones et al. | 370/384 |
| 5,365,524 | A * | 11/1994 | Hiller et al. | 370/376 |
| 6,259,691 | B1 * | 7/2001 | Naudus | 370/352 |
| 6,611,519 | B1 * | 8/2003 | Howe | 370/386 |
| 6,628,676 | B1 * | 9/2003 | Grohn et al. | 370/508 |
| 6,721,322 | B1 * | 4/2004 | Lakhani et al. | 370/352 |
| 6,763,010 | B1 * | 7/2004 | Piirainen et al. | 370/337 |
| 2005/0058149 | A1 * | 3/2005 | Howe | 370/428 |

FOREIGN PATENT DOCUMENTS

WO WO 99/65197 12/1999

OTHER PUBLICATIONS

Kuo G-S et al. "Nesxt Generation Broadband Switching Router System Architecture for Future Multimedia-Oriented Internet: Design and Analysis" *Proceedings of the 1999 IEEE International Conference on Communications*, Vancouver, BC, Canada, v. 3, Jun. 6-10, 1999, pp. 1452-1457.

Huber et al. "Modelling of a Multi-Queue Polling System with Arbitrary Server Interrups for teh Idle-Slot-Concatenation Packet Switching Principle in a Hybrid CS/PS Node" *Proceedings of the 12th International Teletraffic Congress (ITC-12)*, Torino Italy, Jun. 1-8, 1988, pp. 521-528.

(Continued)

*Primary Examiner*—Ajit G Patel

(57) ABSTRACT

At present to facilitate multimedia/fax/realtime applications on the Internet requires the IP packets to be given priority over other packets by methods such as RSVP/Tag Switching to ensure Quality of Service. Here is presented a method whereby an Internet Time multiplexed Circuit Connection is established enabling data communications at both ends in exactly the same way as in the case where the Internet Connection so established is a PSTN switched circuit connection, at wire speed with same transmissions quality. At predetermined periods (the single individual periods of which may be different in time durations at each nodes) all selected nodes between source & destination are arranged to automatically switch incoming signals to next node at wire speed without buffering delay/route computation delay, thus establishes a Time Multiplexed Circuit Connection for the durations of the predetermined periods, as in the case where a simplex PSTN dedicated circuit connection has been established.

10 Claims, 1 Drawing Sheet

OTHER PUBLICATIONS

Figure 1:
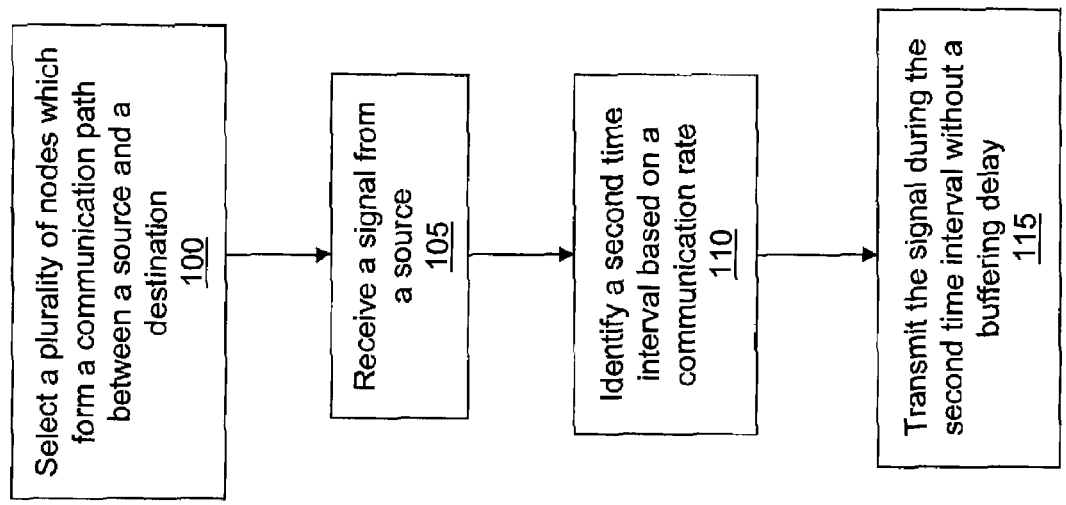

Gallagher C A, "IEEE 802.9: A Multi-Service LAN Interface" *Proceedings of the 2nd National Conference on Telecommunications*, Apr. 2-5, 1989, pp. 173-78.

International Search Report for PCT/GB2001/00592 mailed Nov. 30, 2001, 2 pages.

The Written Opinion and International Preliminary Report on Patentability for PCT/GB2001/00592 issued Aug. 19, 2005, 13 pages.

* cited by examiner

INTERNET TIME MULTIPLEXED CIRCUIT CONNECTION FOR WIRE SPEED CONNECTION AKIN TO PSTN SWITCHED CIRCUIT CONNECTION SUITABLE FOR MULTIMEDIA/VOICE/FAX/REALTIME APPLICATIONS

CROSS REFERENCE TO RELATED APPLICATION

The application claims the benefit pursuant to 35 USC 119 of U.S. Provisional patent Application No. 60/182,518 filed on Feb. 15, 2000.

STATEMENT REGARDING FEDERALLY SPONSORED RESEARCH OR DEVELOPMENT

Not Applicable

REFERENCE TO A 'SEQUENCE LISTING', A TABLE, OR A COMPUTER PROGRAM LISTING APPENDIX SUBMITTED ON COMPACT DISC

Not Applicable

BACKGROUND OF THE INVENTION

1. Field of the Invention

At present to facilitate multimedia/voice/fax/realtime applications on the Internet requires the IP packets to be given priority over other packets by methods such as RSVP/Tag Switching to ensure Quality of Service.

Here is presented a method whereby an Internet Time multiplexed Circuit Connection is established enabling data communications at both ends in exactly the same way as in the case where the Internet Connection so established is a PSTN switched circuit connection, at wire speed with same transmissions quality. Data is transmitted without IP packetising, session & communications protocols are handled by & between both end users.

2. Description of the Related Art Including Information Disclosed Under 37 CR 1.97 and 1.98

Foreign Application Data

Data Code Application Number Pub. No. Pub. Date Grant Date

15 Feb. 1999 GB9903321.9 GB2343083 26 Apr. 2000 29 Nov. 2000

13 Feb. 2001 PCT/GB01/00592 WO 01/61982 A2 23 Aug. 2001

06 Aug. 2003 CA 2345841 N/A N/A

BRIEF SUMMARY OF THE INVENTION

Here is presented a method whereby an Internet Time multiplexed Circuit Connection is established enabling data communications at both ends in exactly the same way as in the case where the Internet Connection so established is a PSTN switched circuit connection, at wire speed with same transmissions quality.

At predetermined periods (the single individual periods of which may be different in time durations at each nodes) all selected nodes between source & destination are arranged to automatically switch incoming signals to next node at wire speed without buffering delay/route computation delay, thus establishes a Time Multiplexed Circuit Connection for the durations of the predetermined periods, as in the case where a simplex PSTN dedicated circuit connection has been established

BRIEF DESCRIPTION OF THE SEVERAL VIEW OF THE DRAWINGS

Not Applicable

FIG. 1 is a flow diagram illustrating operations performed by a connections manager in accordance with an exemplary embodiment. In alternative embodiments, additional, fewer, and/or different operations may be performed. Further, the use of a flow diagram is not meant to be limiting with respect to the order of operations performed. In an operation 100, a plurality of nodes which form a communication path between a source and a destination are selected. For example, as described above, nodes A, B, C, and D can be selected to form a communication path (or time multiplexed circuit connection) between source node A and destination node D. In an operation 105, a signal is received from a source. In one embodiment, the signal can be part of a plurality of signals that are received at a rate of one signal per time interval. For example, the plurality of signals may be analog voice signals which are received at a rate of one signal every $\frac{1}{10}$ of a second, as described above. In an operation 110, a second time interval is identified based on a communication rate between the nodes which form the communication path. In an exemplary embodiment, as described above, the second time interval can be based on the lowest communication rate between the nodes which form the communication path. For example, as described above, the second time interval may be one millionth of a second if the lowest communication rate is 6.4 Gigabits/second, one thousandth of a second if the lowest communication rate is 6.4 Megabits/second, and so on. In an operation 115, the signal is transmitted during the second time interval without a buffering delay. The signal can also be transmitted without route computation delay. As described above, the second time interval can occur after the time interval in which the signal is received in order to minimize delay. Thus, continuing the example from above (and assuming a second time interval of one thousandth of a second), the signal received during a first $\frac{1}{10}$ of the second interval (T2-1) can be transmitted from the source to a destination during a one thousandth time period (i.e., $\frac{1}{1000}$ of the second time interval) which occurs during a second $\frac{1}{10}$ time period (T2-2) subsequent to the first $\frac{1}{10}$ time period (T2-1). Similarly, a signal received during the second $\frac{1}{10}$ time period (T2-2) can be transmitted from the source to the destination during a one thousandth of a second interval which occurs during a third $\frac{1}{10}$ time period (T2-3) which is subsequent to the second $\frac{1}{10}$ time period (T2-2). A signal received during the third $\frac{1}{10}$ time period (T2-3) can be transmitted from the source to the destination during a one thousandth of a second interval which occurs during a fourth $\frac{1}{10}$ time period (T2-4) which is subsequent to the third $\frac{1}{10}$ time period (T2-3), and so on.

DETAILED DESCRIPTION OF THE INVENTION

A Worldwide Connections Manager arranges at predetermined periods all selected nodes between source & destination to automatically switch incoming signals to next node at wire speed without buffering delay/route computation delay, thus establishes a Time Multiplexed Circuit Connection for the durations of the predetermined periods, as in the case where a simplex PSTN dedicated circuit connection has been established & individual digital signal bits could be transmitted at any time & received instantaneously. For Duplex communication requirements, 2 unidirectional Virtual dedicated circuit connections are set up, one in each directions (& could be of different bandwidths), preferably along the route in both directions with prearranged automatic switchings of transmissions at the same predetermined time periods to have similar transmission line dependant characteristics. Half Duplex will have 2 unidirectional Time Multiplexed Circuit Connections with only one of them needs to be maintained at any one time. The caller & receiving side nodes/ITSP access the Worldwide Connections Manager for simplex/half-duplex/full duplex Time Multiplexed Circuit Connections initialisations, monitoring & releases.

A number of individual bit transmissions (continuously) from various sources could be conveniently interleaved time multiplexed at source side node/ITSP, instantaneously received (as in PSTN transmissions) & demultiplexed at destination side node/ITSP (converted to analog if required) thereby forwarded to various destination receivers. Worldwide Connections Manager may arrange so that the routers at the nodes automatically switches various incoming Time Multiplexed Circuit Connection transmissions from several neighbouring nodes contiguously time multiplexed (ie the various predetermined time periods bandwidths coincide as a larger continuous predetermined time periods transmissions) onto next common node hops by intelligent schedulings of predetermined time periods bandwidth allocations during initialisations of Virtual dedicated circuit connections (so that predetermined time frames allocated to various sources merge seamilessly interleaved time multiplexed into bigger continuous blocks for onward next node hops).

In practise, for a single Voice telephony, the 4 KHz analog signals at say $1/10$ second intervals are first converted to 6.4 Kbits/sec digital signals using PCM (sampling at twice the analog frequency, & uncompressed/compressed as required) and then time division concentrated/multiplexed along with regular IP packet traffics by the caller side node/ITSP (as 1/millionth of a second duration digital transmission) onto say the 6.4 Gigabits/sec transmission link (ie equates to the communications rate of the lowest link along the nodes) to the next node (which in turn automatically switches the transmissions onto the next node, & so forth) along the Time Multiplexed Circuit Connection as raw unpacketised digital signals of 1/millionth of a second duration at the precise prearranged 1/millionth of a second time period where the Time Multiplexed Circuit Connection between Source & destination is established. The 1/millionth of a second digital signal received at receiver side node/ITSP is then converted back into a $1/10$ second 4 KHz analog signals to be forwarded to recipient. The next $1/10$ second interval 4 KHz analog signal from caller is again digitised, transmitted along the Time Multiplexed Circuit Connection at the next 1/millionth of a second period (occurring at intervals of $1/10$ second), reconverted back into a $1/10$ second interval 4 KHz analog signals at receiver side node/ITSP, & received at recipient as a continuous series of $1/10$ second speech. No network delays due to transmission on the Internet will be encountered as in present Voice IP packet transmissions. The total delays between the speech at caller & reception at recipient here is $1/10$ second plus 2x analog/digital conversion delays (~30 msec), ie total fixed delay of 0.16 second regardless of distance (ignoring the time for the uncompressed signals to travel along the transmission medium).

A thousand originating calls from say London could be interleaved time multiplexed at source side node/ITSP as a single 1/thousandth of a second duration digital transmissions onto the 6.4 Gigabits/sec transmission link at the precise prearranged 1/thousandth of a second time periods where the Time Multiplexed Circuit Connection between source & destination is established, received at destination node/ITSP, demultiplexed & converted back into one thousand $1/10$ second duration 4 KHz analog speech signals to be forwarded along dialled up PSTN lines to receiving telephones.

Not all links along the selected nodes communicates at the same rate. Say the single Voice signals above transverse nodes A, B, C, D and the links A-B communicates at 6.4 Megabits/sec, B-C at 6.4 Gigabits/sec & C-D at 6.4 Megabits/Sec, node A will be prearranged to automatically switch incoming transmission (PCM digitised $1/10$ second 4 KHz analog signals) onto node B starting at Time 0 for 1/thousandth of a second duration. The 1/thousandth of a second duration transmission arriving at node B between Time 0 & Time 0+1/thousandth second is automatically switched at Time 0 onto node C for same 1/thousandth of a second duration (ie interleaved time multiplexed, regularly allocated one slot for every 1,000th slots in the 6.4 Gigabits/sec transmission bandwidth during the 1/thousandth of a second prearranged time period). The 1/thousandth of a second duration transmission arriving at node C between Time 0 & Time 0+1/thousandth second will be automatically demultiplexed to obtain the PCM Voice signals to be automatically switched onto destination node D arriving during Time 0 & Time 0+1/thousandth second (the 1/thousandth of a second time period here is the time period required for $1/10$ second interval Voice speech to be transmitted along the link of the lowest communication rate, ie link A-B/C-D). It may be seen to be wasteful of allocated time multiplexed Bandwidth at link B-C, this is overcome by intelligently arranging for similar 1/Millionth of a second duration incoming Time Multiplexed Circuit Connection transmissions from other nodes neighbouring node B to arrive at node B at the right time slots (less time critical arriving transmissions may be interleaved time slot shifted) to be interleaved time slot multiplexed into the 1/thousandth of a second bandwidth for common next node hop onto node C. [

Alternatively without hardware demultiplexing of 6.4 Gigabits/sec incoming transmission at node C, node B could be prearranged to automatically switch transmission onwards to node C a thousand times (each time for 1/thousand millionth second duration, ie corresponding to transmission time for a single time multiplexed slot) during Time 0 & Time 0+1/thousandth second. Node C transmits each PCM signals contained in the 1,000 time multiplexed slots, between Time 0 & Time 0+1/thousandth second automatically onto node D along the slower 6.4 Megabits/sec link, having first buffered the incoming time multiplexed Voice slots to adjust for the different communication rates of the links (without incurring signal transmission delays here as the signals are buffered for onwards slower transmission)]

The nodes are synchronised to each other for transmissions. The Time 0 referred to above ignores the time for signals to travel along the transmission medium. In reality, the Time 0 at nodes A, B, C & D are each adjusted to take into account the time it take for signals to arrive travelling along the immediately preceding links.

The invention claimed is:

1. A method comprising:
   receiving, at a first node of a selected plurality of nodes forming a communication path between a source and a destination, a first signal from the source, wherein the first signal is part of a first signal stream comprising a first plurality of signals which are received at a rate of one signal per time interval;
   interleaving the first signal and a second signal, wherein the second signal is part of a second signal stream comprising a second plurality of signals;

identifying, based at least in part on a lowest communication rate along the communication path, a second time interval, wherein the second time interval occurs after receipt of the first signal; and transmitting the first signal and the second signal from the first node to a second node of the communication path without a buffering delay, wherein the first signal and the second signal are transmitted during the second time interval.

2. A system comprising:

a first node and a second node along a communication path between a source and a destination, wherein the first node is configured to receive a first signal from the source, wherein the first signal is part of a first signal stream comprising a first plurality of signals which are received at a rate of one signal per time interval; and a connection manager configured to
interleave the first signal and a second signal, wherein the second signal is part of a second signal stream comprising a second plurality of signals; and
identify, based at least in part on a lowest communication rate along the communication path, a second time interval, wherein the second time interval occurs after receipt of the first signal, wherein the first node is further configured to transmit the first signal and the second signal to the second node during the second time interval and without a buffering delay.

3. The system of claim 2, further comprising a first unidirectional virtual dedicated circuit connection and a second unidirectional virtual dedicated circuit connection, wherein the first unidirectional virtual dedicated circuit connection and the second unidirectional virtual dedicated circuit connection are used to form the communication path.

4. The system of claim 2, wherein the connection manager is further configured to time multiplex the first signal and the second signal.

5. A system comprising:

a first Internet connected node and a second Internet connected node, wherein the first Internet connected node is configured to receive a first signal from a source, and further wherein the first signal is part of a first signal stream comprising a first plurality of signals which are received by the first Internet connected node at a rate of one signal per time interval; and a connection manager configured to:
interleave the first signal and a second signal, wherein the second signal is part of a second signal stream comprising a second plurality of signals;
identify a communication path between the source and a destination, wherein the communication path includes the first Internet connected node and the second Internet connected node; and
identify, based at least in part on a lowest communication rate along the communication path, a second time interval which occurs after receipt of the first signal, wherein the first Internet connected node is configured to transmit the first signal and the second signal to the second Internet connected node during the second time interval without a route calculation delay, and further wherein the second Internet connected node is configured to transmit the first signal and the second signal to a third Internet connected node along the communication path during the second time interval and without the route calculation delay.

6. The system of claim 5 wherein the first Internet connected node includes a first unidirectional virtual dedicated circuit connection and the second Internet connected node includes a second unidirectional virtual dedicated circuit connection.

7. The system of claim 5, wherein the first signal and the second signal are transmitted by the first Internet connected node and the second Internet connected node without a buffering delay.

8. The system of claim 5, wherein the connection manager is further configured to time multiplex the first signal and the second signal.

9. The method of claim 1, wherein the communication path includes a first unidirectional virtual dedicated circuit connection and a second unidirectional virtual dedicated circuit connection.

10. The system of claim 2, wherein said connection manager is further configured to time multiplex the first signal and the second signal.

* * * * *

UNITED STATES PATENT AND TRADEMARK OFFICE
CERTIFICATE OF CORRECTION

PATENT NO. : 7,545,799 B2
APPLICATION NO. : 09/779939
DATED : June 9, 2009
INVENTOR(S) : Bob Tang It is certified that error appears in the above-identified patent and that said Letters Patent is hereby corrected as shown below:

ON THE TITLE PAGE

Item (56), under "OTHER PUBLICATIONS":

Delete "Nesxt" and replace with --Next--

Kuo G-S et al. "~~Nesxt~~ Next Generation Broadband Switching Router System Architecture for Future Multimedia-Orientated Internet: Design and Analysis" *Proceedings of the 1999 IEEE International Conference on Communications,* Vancouver, BC, Canada, v. 3, Jun. 6-10, 1999, pp. 1452-1457.

Item (56), under "OTHER PUBLICATIONS":

Delete "Interrups" and replace with --Interrupts--

Delete "teh" and replace with --the--

Huber et al. "Modelling of a Multi-Que Polling System with Arbitrary Server ~~Interrpus~~ Interrupts for ~~teh~~ the Idle-Slot-Concatenation Packet Switching Principle in a Hybrid CS/PS Node" *Proceedings of the 12$^{th}$ International Teletraffic Congress (ITC-12).* Torino Italy, Jun. 1-8, 1988, pp. 521-528.

ON THE TITLE PAGE

Item (57), under "ABSTRACT":

Insert the word --voice-- in the first line, between the words "multimedia/" and "/fax"

UNITED STATES PATENT AND TRADEMARK OFFICE
CERTIFICATE OF CORRECTION

PATENT NO.        : 7,545,799 B2
APPLICATION NO.   : 09/779939
DATED             : June 9, 2009
INVENTOR(S)       : Bob Tang It is certified that error appears in the above-identified patent and that said Letters Patent is hereby corrected as shown below:

Claim 6, col. 6, line 23:

Insert a comma --,-- after "claim 5"

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,545,799 B2 | Page 1 of 1 |
| APPLICATION NO. | : 09/779939 | |
| DATED | : June 9, 2009 | |
| INVENTOR(S) | : Tang | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 173 days Delete the phrase "by 173 days" and insert -- by 843 days --

Signed and Sealed this

Thirteenth Day of July, 2010

David J. Kappos
*Director of the United States Patent and Trademark Office*